UNITED STATES PATENT OFFICE.

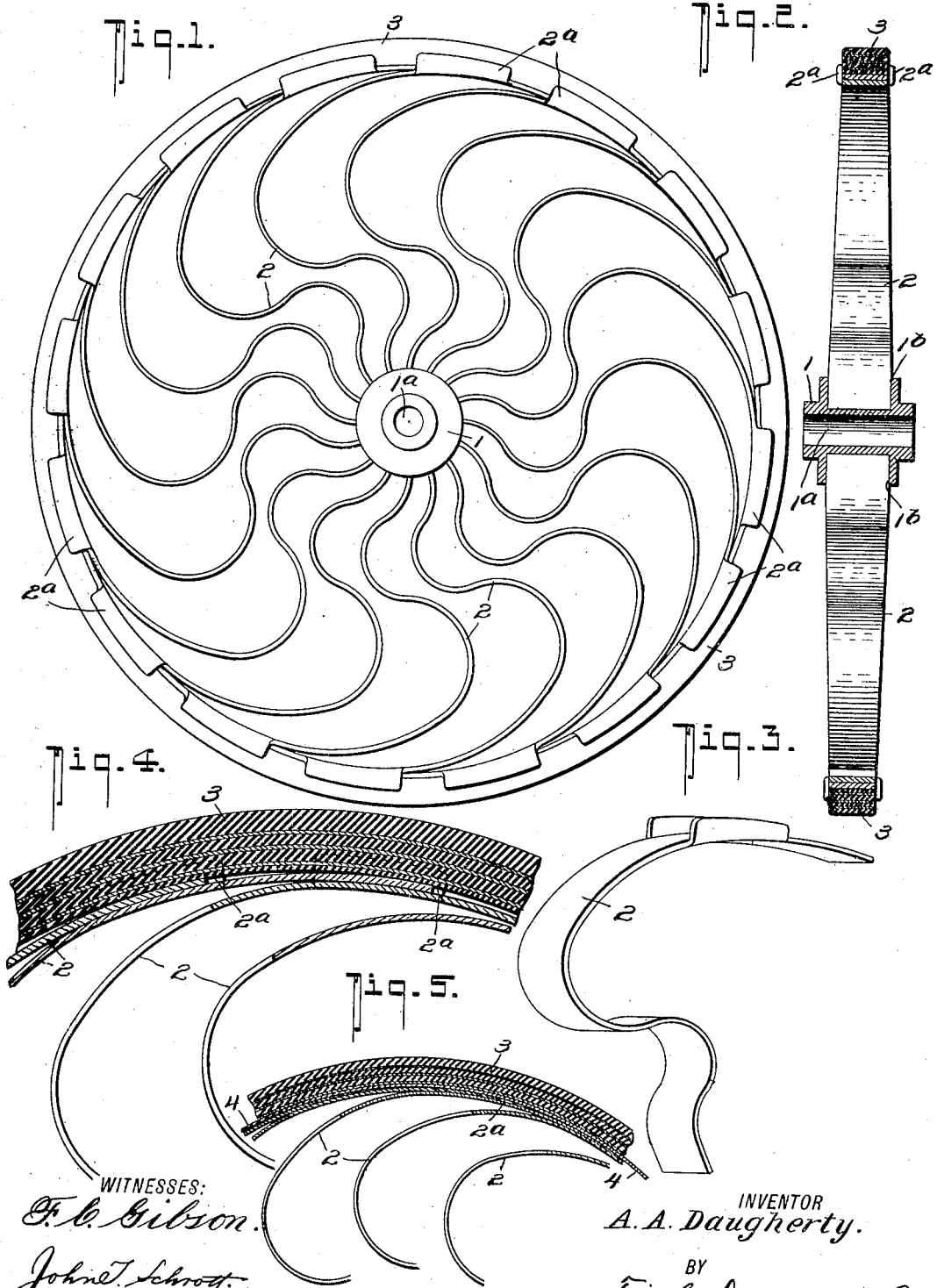

ALVIN ALEXANDER DAUGHERTY, OF NEW YORK, N. Y.

VEHICLE-WHEEL.

No. 849,373.　　　　　Specification of Letters Patent.　　　　　Patented April 9, 1907.

Application filed July 18, 1906. Serial No. 326,706.

*To all whom it may concern:*

Be it known that I, ALVIN ALEXANDER DAUGHERTY, residing in New York city, county of New York, and State of New York, have invented certain new and useful Improvements in Vehicle-Wheels, of which the following is a specification.

My invention relates to certain new and useful improvements in vehicle-wheels; and it more particularly has for its object to provide a wheel of a very simple and effective construction which will have a substantial amount of resiliency to serve as much as possible as a shock-absorber.

The invention is particularly adapted for use as an automobile or vehicle wheel, although applicable to any type of vheicle.

Generically my invention comprises a wheel having spring-spokes each overlapping the other at the rim ends and provided at such ends with substantial U-shaped portions to receive and hold a belt-like tire composed of rubber or canvas and rubber, the spokes being secured at their hub ends to a suitable hub.

With other objects in view than have been heretofore specified the invention also comprises certain novel construction, combination, and arrangement of parts, all of which will be first described in detail and then be specifically pointed out in the appended claims, reference being had to the accompanying drawings, in which—

Figure 1 is a side elevation of my invention. Fig. 2 is a vertical cross-section thereof, the spokes being shown in elevation. Fig. 3 is a detail perspective view of one spoke. Fig. 4 is an enlarged detail longitudinal section of a part of the rim or tire and the adjacent ends of the spokes. Fig. 5 is a detail sectional view of a modified form of my invention.

Referring now to the accompanying drawings, in which like letters and numbers of reference indicate like parts in all of the figures, 1 designates the wheel-hub, having the usual bearing-aperture $1^a$ and provided with spoke-sockets $1^b$ to receive the spokes 2, and the spokes 2 may be secured to the hub in any approved manner—for instance, by wedging the same into the spoke-aperture.

The spokes 2 in my present invention are preferably formed of spring-steel and are of a greater width adjacent to the rim. The spokes are formed tapering from the hub outward and are bent into an approximately zigzag form in side elevation.

The rim-engaging ends of the spokes overlap each other and are formed with side ribs or flanges $2^a$ to make a substantially U-shaped seat to receive the rim or tire 3, which in my present invention is composed of rubber or rubber and canvas in the nature of a heavy belting.

The spokes 2 are not fixedly secured to the tire 3, and the tire 3 is prevented from coming off the spokes by the flanges $2^a$.

In operation the spring-spokes by reason of their form and by reason of the overlapping ends thereof will act as a shock-absorber, while at the same time allowing the wheel to be sufficiently rigid as to properly serve its usual functions. The overlapping spoke ends act as a spring formed of several overlapping leaves, which will slip over one another as the wheel revolves. Thus it will be seen the wheel has no rigid or fixed tire, and the tire is not fixedly secured to the fixed spokes and may be quickly and readily removed and replaced when conditions require. At the same time by having a wheel constructed along the lines hereinbefore described and as shown in the drawings the pneumatic cushion-tires now commonly in use on motor-vehicle wheels and bicycle-wheels may be dispensed with entirely, as their resilient function is performed by the spokes of my wheel. A removable tire 4, of thin steel, of the same width as the rubber or canvas tire may be placed over the spoke ends between them and the rubber or canvas tire to allow for the sliding of the ends of the spring-spokes of the wheel and prevent the friction of the spokes on the rubber or canvas tire from injuring the same. I may also omit the tires and the spoke-flanges if it be desired to use the wheel without the same, such as on bicycles or light vehicles.

From the foregoing description, taken in connection with the accompanying drawings, it is thought the complete construction, operation, and numerous advantages of my invention will be readily understood by those skilled in the art to which the invention appertains, and I desire to say that many slight changes in the detail construction, combination, and arrangement of parts may be made without departing from the spirit of the invention or the scope of the appended claims.

What I claim is—

1. A vehicle-wheel comprising in combination, a hub, a series of resilient spokes each having one end secured to said hub, and said spokes having their other ends bent to overlap each other, and a rim or tire removably held over the overlapping ends of the spoke.

2. A vehicle-wheel comprising a hub, a series of resilient spokes having one end of each secured to said hub and having overlapping ends bent to overlap and engage each other, a tire, means forming a part of said spokes for holding the tire over the overlapped spoke ends.

3. A vehicle-wheel comprising a hub, a series of resilient spokes having one end of each secured to said hub and having overlapping ends bent to overlap and engage each other, a tire, means forming a part of said spokes for holding the tire over the overlapped spoke ends, said means comprising flanges on the overlapping ends of the spokes to form a tire-receiving channel.

4. A wheel comprising in combination, a hub, resilient spokes secured thereto, said spokes tapering from the hub end outward and bent into an approximately zigzag form in side elevation, and having the outer ends bent to overlap each other, and a flexible tire held over the overlapping spoke ends.

5. A wheel comprising in combination, a hub, resilient spokes secured thereto, said spokes tapering from the hub end outward and bent into an approximately zigzag form in side elevation, and having the outer ends bent to overlap each other, a flexible tire held over the overlapping spoke ends, said overlapping spoke ends having flanges to retain said tire.

6. A vehicle comprising a hub, resilient spokes secured thereto, of curved form in side elevation, said spokes having their outer or rim-engaging ends bent to overlap each other, and a tire held over said overlapping ends and unsecured to said spokes, substantially as shown and described.

7. A vehicle comprising in combination, a hub, a series of resilient spokes each having one end secured to said hub, and said spokes having their other ends bent to overlap each other and means carried by the overlapping spoke ends for forming a peripheral channel, substantially as shown and described.

8. A vehicle comprising in combination, a hub, a series of resilient spokes each having one end secured to said hub, said spokes having their other ends bent to overlap each other, and a metallic tire removably held over said overlapped spoke ends, substantially as shown and described.

9. A vehicle comprising in combination, a hub, a series of resilient spokes each having one end secured to said hub, said spokes having their other ends bent to overlap each other, and a flexible metallic tire removably held over said overlapped spoke ends, substantially as shown and described.

10. A vehicle comprising in combination, a hub, a series of resilient spokes each having one end secured to said hub, said spokes having their other ends bent to overlap each other, a metallic tire removably held over said overlapped spoke ends, and a flexible resilient tire held over the metallic tire, substantially as shown and described.

11. A resilient wheel having the spokes thereof extended to form a yieldable tread-surface and provided with lugs at each side of the tread-surface to form a peripheral recess or channel, substantially as shown and described.

12. A resilient wheel having the spokes thereof extended to form a yieldable tread-surface and provided with lugs at each side of the tread-surface to form a peripheral recess or channel and a tire held in said channel substantially as shown and described.

ALVIN ALEXANDER DAUGHERTY.

Witnesses:
T. B. WILKINSON,
J. E. HILL.